United States Patent [19]

Ishii et al.

[11] Patent Number: 5,276,072
[45] Date of Patent: Jan. 4, 1994

[54] HYDROPHILIC RESIN CONTAINING OXAZOLIDONE RINGS AND COATING COMPOSITION CONTAINING SAME

[75] Inventors: Toshiyuki Ishii, Sakai; Mitsuo Yamada; Motoi Tanimoto, both of Suita; Kenshiro Tobinaga, Kawanishi, all of Japan

[73] Assignee: Nippon Paint Co., Ltd., Osaka, Japan

[21] Appl. No.: 985,417

[22] Filed: Dec. 4, 1992

[30] Foreign Application Priority Data

Dec. 6, 1991 [JP] Japan .................. 3-349631

[51] Int. Cl.$^5$ .......................... C08K 3/20; C08L 63/02
[52] U.S. Cl. ........................................ 523/415; 528/96
[58] Field of Search ........................... 523/415; 528/96

[56] References Cited

U.S. PATENT DOCUMENTS 3,415,901  12/1968  Schramm et al. ..................... 528/96

FOREIGN PATENT DOCUMENTS 2038786  3/1991  Canada .

OTHER PUBLICATIONS

Kordomenos et al., J. of Coatings Tech. vol. 55, p. 51 (1983).

*Primary Examiner*—Melvyn I. Marquis
*Assistant Examiner*—D. Aylward
*Attorney, Agent, or Firm*—Millen, White, Zelano & Branigan

[57] ABSTRACT

Oxazolidone ring-containing epoxy resins (a) produced by the reaction between a diglycidyl ether or ester and an organic diisocyanate are reacted with (b) a first active hydrogen compound such as mono- or diols, mono- or dicarboxylic acids in less than a stoichiometric amount in terms of the active hydrogen atom relative to the epoxy group, and then with (c) a second active hydrogen compound such as amines or sulfide-acid mixtures or polycarboxylic acids in a stoichiometric amount relative to the remaining epoxy group. The resulting hydrophilic modified resin has an oxazolidone ring-containing backbone terminated with an ionizable group. A water-borne paints are formulated from the hydrophilic modified resin by dispersing in an aqueous medium containing a crosslinker and a neutralizing agent.

14 Claims, No Drawings

HYDROPHILIC RESIN CONTAINING OXAZOLIDONE RINGS AND COATING COMPOSITION CONTAINING SAME

BACKGROUND OF THE INVENTION

This invention relates to a novel hydrophilic resin which has an oxazolidone-ring containing backbone and an ionizable group at the terminal end of the backbone. It also relates to a water-borne paint composition containing said resin.

It is known from Iwakura et al., J. Polymer Sci. Part A-1, 4, 751 (1966) that an oxazolidone ring-containing modified epoxy resin may be produced by reacting a diglycidyl compound and a bisurethane, namely a monoalcohol-capped organic diisocyanate. The same resin may be produced by directing reacting a diisocyanate and the diglycidyl compound. Sander et al., J. Appl. Polymer Sci., 9 1984(1966). Since the resin is terminated with an epoxy group at each end and thus does not possess any ionizable or hydrophilic group, it is not usable in formulating electrodeposition paints and other water-borne paints.

European Patent Application Publication No. 0449072 discloses a method for producing epoxy resin-amine adducts used for the formulation of cathodic electrodeposition paints. According to this method, an oxazolidone ring containing compound produced by the reaction between a mono- or diglycidyl compound and an organic mono- or diisocyanate is directly subjected to a ring-opening reaction with an amine in conjunction with a conventional diepoxy resin. In use the electrodeposition pant containing this binder resin requires a relatively high voltage as high as 300 volt. When applied to the electrodeposition coating of galvanized steel sheets, the paint often fails to give a film of practical film thickness without occurrence of a number of pinholes due to the application of such a high voltage. This, of course, tends to degrade not only the appearance but also protective performance of the resulting finish. This European Patent also discloses a method Of producing the Oxazolidone ring-containing compound by directly reacting an organic diisocyanate and a glycidyl compound in the presence of lithium bromide catalyst. When directly reacting with the glycidyl compound, the diisocyanate tends to undergo a trimeization side reaction. If this side reaction occurred, the resulting modified resin would become too viscous and of less oxazolidone content. The alkali metal halide catalyst still remains in the modified resin. This is undesirable particularly when used in the electrodeposition coating because the presence of any electrolyte in the coating bath would adversely affect not only its electrodeposition performance such as coulomb efficiency and throwing power but also the corrosion resistance of films made therefrom.

The present invention is intended to eliminate or ameliorate these and other defects of the prior art resins and compositions.

SUMMARY OF THE INVENTION

This invention provides a novel hydrophilic resin which has an oxazolidone ring-containing backbone and an ionizable group at the terminal end of the backbone. The hydrophilic resin is produced by modifying an oxazolidone ring-containing epoxy resin of the formula:

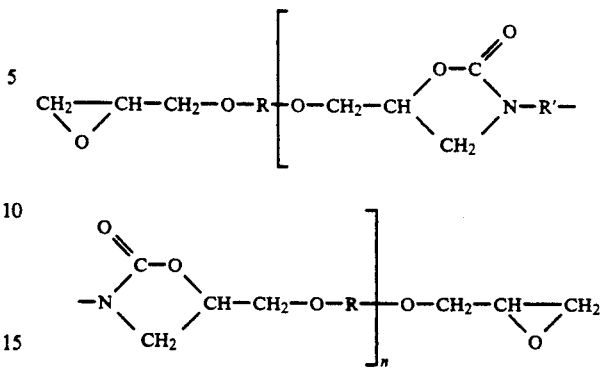

wherein R is the residue of diglycidyl ether or ester compound with removal of the glycidyloxy group, R' is the residue of an organic diisocyanate with removal of the isocyanate group, and n is an integer.

According to the present invention, the starting epoxy resin (a) is reacted with at least a first active hydrogen compound (b) selected from the group consisting of a monoalcohol, a diol, a monocarboxylic acid and a dicarboxylic acid to open a portion of the epoxy rings of (a), and then with a second active hydrogen compound (c) to introduce an ionizable group by means of the ring-opening reaction of the remaining epoxy rings with said second active hydrogen compound (c). The resulting modified resin has a plurality of oxazolidone rings in its backbone terminated with the ionizable group.

In a preferred embodiment, the starting epoxy resin (a) is a reaction product of a bisphenol epoxy resin with an organic diisocyanate or its blocked product. When the first active hydrogen compound (b) is bifunctional such as polyether diols, polyester diols, bisphenols, aliphatic or aromatic dicarboxylic acids, a chain extending reaction takes place. In lieu of or in addition to the bifunctional first active hydrogen compound, a monofunctional first active hydrogen compound such as aliphatic primary alcohols, monophenols and aliphatic or aromatic monocarboxylic acids may be reacted with the starting epoxy resin (a). It should be noted that not all epoxy rings possessed by the starting epoxy resin (a) should be consumed in the reaction with the first active hydrogen compound. Thus, the quantity of the first active hydrogen compound (b) to be reacted with the starting epoxy resin (a) should be less than stoichiometric so that at least 10%, preferably 20-80%, more preferably 30-70% in average of the epoxy rings remain intact.

The reaction product between the starting epoxy resin (a) and the first active hydrogen compound (b) is then reacted with an amount of the second active hydrogen compound (c) sufficient to open the remaining epoxy rings to introduce an ionizable group. When a cationic resin is desired, the second active hydrogen compound may be a primary or secondary amine, or an acid addition salt of a tertiary amine. Alternatively, a sulfide-acid mixture may be used to give a sulfonium cationic resin. When an anionic resin is desired, the second active hydrogen compound may be a polycarboxylic acid.

In another aspect, the present invention provides a water-borne paint comprising the hydrophilic resin produced by the above-discussed method. The hydrophilic resin is dispersed in an aqueous medium containing a crosslinking agent such as melamine resins or blocked polyisocyanates and as a neutralizing agent an acid in case of cationic resins or a base in case of anionic resins.

The water-borne paint of the present invention exhibits, when applied electrically, a high throwing power and gives a cured film having improved appearance and corrosion resistance properties.

It has been known in the art that the throwing power and corrosion resistance of electrodeposition paints may be improved by using a binder resin having a relatively high glass transition temperature (Tg). However, this attempt fails because higher Tg adversely affects the fluidity of the binder resin and thus impairs the appearance of the cured film.

The modified resin of the present invention may solve this problem. It exhibits improved corrosion resistance and throwing power while retaining good appearance in the cured film. As a reason therefor, it is postulated that the resin of the present invention still retains a satisfactory fluidity although its Tg is relatively high because of incorporation of oxazolidone rings in the molecule.

DETAILED DESCRIPTION OF THE INVENTION

The starting epoxy resin (a) having a plurality of oxazolidone rings is known. The starting resin (a) may be produced either by the method of Iwakura et al., supra in which a glycidyl ether or ester is reacted with a blocked diisocyanate typically in the form of bisurethane (this method is hereinafter referred to as "BI method"), or by the method disclosed in Sander et al., supra in which a free diisocyanate is directly reacted with the diglycidyl compound (this method is hereinafter referred to as "direct method"). Since the direct method may often be accompanied by a trimerization side reaction of the diisocyanate, the BI method is preferable.

Typical examples of diglycidyl compounds are bisphenol A epoxy resins such as EPIKOTE 828 (epoxy equivalent 180-190), EPIKOTE 1001 (epoxy equivalent 450-500) or EPIKOT 1010 (epoxy equivalent 3000-4000), and bisphenol F epoxy resins such as EPIKOTE 807 (epoxy equivalent 170), all sold by Yuka Shell Epoxy K.K.. Also included in usable diglycidyl compounds are diglycidyl ethers of aliphatic diols such as ethylene glycol, propylene glycol, 1, 4-butanediol, 1, 6-hexanediol, polyethylene glycol, polypropylene glycol and the like, and diglycidyl esters of aliphatic, alicyclic or aromatic dicarboxylic acids.

Examples of usable diisocyanate compounds include aromatic diisocyanates such as tolylenediisocyanate (TDI), xylylenediisocyanate (XDI), 4, 4'-diphenylmethanediisocyanate (MDI) and the like; and aliphatic and alicyclic diisocyanates such as hexamethylenediisocyanate (HMDI), isophoronediisocyanate (IPDI), 4, 4-methylenebis(cyclohexyl-isocyanate), trimethylhexamethylenediisocyanate and the like.

In the BI method, the free diisocyanate must be blocked with a blocking agent. The blocking agent may be reacted with the free diisocyanate either before or during the reaction with the diglycidyl compound. In the latter case the blocking agent may be dissolved in the diglycidyl compound and then the free diisocyanate is added to the mixture to form the blocked diisocyanate in situ.

A variety of blocking agents are well-known in the art. Examples thereof include aliphatic alcohols such as methanol, ethanol, isopropanol, n-butanol, 2-ethylhexanol, ethyleneglycol monobutyl ether, cyclohexanol and the like; phenols such as phenol, nitrophenol, ethylphenol and the like; oximes such as methyl ethyl ketoxime; and lactams such as $\epsilon$-caprolactam. In order to produce the starting epoxy resin (a) having an epoxide function at each terminal end, at least $n+1$ moles of the diglycidyl compound should be reacted with n moles of the blocked diisocyanate. The reaction may preferably be carried out at a temperature between 60° C. and 200° C. As the reaction proceeds, the blocking agent is liberated. This blocking agent may be retained in the reaction mixture or it may be removed from the reaction mixture using a conventional technique.

It is known that a tertiary amine catalyzes a smooth reaction between an epoxy compound and a carbamate ester in the synthesis of the corresponding 2-oxazolidinone compound. This principle may also be applied to the BI method to advantage. Examples of tertiary amines used for this purpose include N, N-dimethylbenzylamine, triethylamine, N, N-dimethylcyclohexylamine, N, N, N', N'-tetraethylethylenedia mine, N-methylmorpholine, 1, 8-diazabicyclo[5.4.0]undecene, 1, 4-diazabicyclo[2.2.2]octane, pyridine, quinoline, imidazole and the like. In conjunction with the tertiary amine catalyst, a tin compound ma be used including di-n-butyltin dilaurate, stannous chloride, stannous octenate, dibuyltin oxide, dioctyltin oxide, 1, 3-diacetoxytetrabutyldistannoxane, 1, 3-dichlorotetrabutyldistannoxane, dibutyldibutoxytin and the like.

Prior to the introduction of an ionizable group, the starting epoxy resin (a) thus produced may be chain-extended by the reaction with a bifunctional polyol or a bifunctional polycarboxylic acid. Examples of bifunctional polyols used for this purpose include aliphatic diols such as ethylene glycol, 1, 2-propanediol, 1, 3-propanediol, 1, 4-butanediol, 1, 6-hexanediol and the like; alicyclic diols such as 1, 2-cyclohexanediol, 1, 4-cyclohexanediol and the like; aromatic dihydroxyl compounds such as bisphenol A, bisphenol F, resorcinol, hydroquinone and the like; bifunctional polyester polyols (M.W. 300-3,000) such as polycondensates of a dicarboxylic acid and a low molecular weight glycol, or polycaprolactone diols produced by the polymerization reaction of caprolactone using a low molecular weight glycol as an initiator; and bifunctional polyether polyols (M.W. 300-3,000) such as polyethylene glycol, polypropylene glycol, polytetramethylene glycol, random or block copolymers of these polyalkylene glycols. Examples of dicarboxylic chain extenders include succinic acid, adipic acid, azelaic acid, dodecanedioic acid, dimer acid, $C_{18}-C_{20}$ fatty dicarboxylic acids, carboxyl terminated butadiene-acrylonitrile copolymer, phthalic acid, isophthalic acid, terephthalic acid and the like.

When chain extension is not desired, a monofunctional active hydrogen compound is reacted with the starting epoxy resin (a). Examples of monofunctional active hydrogen compounds include primary aliphatic alcohols such as n-butanol, ethylene glycol monobutyl ether, octanol, stearyl alcohol and the like; monophenols such as phenol, cresol, xylenol, p-t-butylphenol, p-nonylphenol and the like; aliphatic monocarboxylic acids such as acetic acid, lactic acid, butyric acid, octanoic acid, cyclohexane carboxylic acid, lauric acid, stearic acid, 12-hydroxystearic acid and the like; and aromatic monocarboxylic acid such as benzoic acid, 1-naphthoic acid and the like.

A combination of monoalcohol/diol or monocarboxylic acid/dicarboxylic acid may also be reacted with the starting epoxy resin (a). In this case the monofunctional active hydrogen compound functions as a regulator of chain extending. It should be noted again that not all epoxide functions possessed by the starting epoxy resin should be consumed in the reaction with the first active hydrogen compound (b), namely the monoalcohol or diol, mono- or dicarboxylic acid taken alone or in combination. At least 10%, preferably 20-80%, more preferably 30-70%, on average of the epoxide functions should remain intact.

After modifying the starting epoxy resin (a) with the first active hydrogen compound (b), an ionizable group of the desired polarity may be introduced to the modified resin using a ring opening reaction of the remaining epoxide function with the second active hydrogen compound (c). When positive namely cationic polarity is desired, the second active hydrogen compound (c) may be a primary or secondary amine, an acid addition salt of tertiary amine, or a sulfide-acid mixture such as butylamine, octylamine diethylamine, dibutylamine, methylbutylamine, monoethanolamine, diethanolamine, N-methylethanolamine, triethylamine hydrochloride, N, N-dimethylethanolamine acetate, diethylsulfide-acetic acid mixture and the like. Ketimines of a primary amine such as aminoethylethanol amine or diethylenetriamine may also be used. Any combination of these amines and ketimines may also be used. Care should be taken when using a primary amine because it also plays the role of a chain extender and renders the resin too viscous. When negative namely aninoic polarity is desired, the second active hydrogen compound (c) may be a dicarboxylic acid such as succinic acid, maleic acid, fumaric acid, phthalic acid, adipic acid, azelaic acid and the like. The amount of second active hydrogen compound (c) should be about stoichiometric relative to the remaining epoxy groups.

The resulting modified hydrophilic resin should preferably have a number average molecular weight measured by the GPC method from 600 to 4,000. If the molecular weight is too low, the resin will not form a satisfactory film. Conversely, if the molecular weight is too high, the resin will become less hydrophilic and thus its emulsification or dispersion in an aqueous medium becomes difficult. Preferably the resin should have an amine or acid equivalent from 0.3-4.0 meq/g. If the amine or acid equivalent is too low, emulsification or dispersion in an aqueous medium becomes difficult. Conversely, if the amine or acid equivalent is too high, it is hardly possible to give a film having a satisfactory water resistance. In order to ensure improved smoothness, corrosion resistance and throwing power, the modified resin should contain from 35 to 95%, preferably from 45 to 85% by weight of the component (a) based on solid basis.

The hydrophilic resin of the present invention may be cured with a crosslinking agent such as melamine resins or blocked polyisocyanates. When formulated in water-borne paints, particularly electrodeposition paints, the resin may exhibit its beneficial features to the fullest extent.

Amine-modified bisphenol epoxy resins have been widely used in water-borne paints, in particular electrodeposition paints. However, cured films made therefrom do not necessarily have satisfactory properties and thus a nee exists for improving corrosion resistance and other electrical and mechanical properties thereof. The modified resin of the present invention may fulfill this need and exhibit improved performance including corrosion resistance and throwing power over the prior art resins.

The modified resins of the present invention may be formulated into water-borne paints including electrodeposition paints by dispersing the resin and a crosslinking agent in an aqueous medium containing a neutralizing agent. Typically the crosslinking agent is an etherified methylolmelamine resin or a blocked polyisocyanate exemplified earlier with reference to the preparation of the starting epoxy resin (a). When cathodic electrodeposition paints are intended, the resin must have a cationic group such as amino or sulfonium and the neutralizing agent must be an acid such as hydrochloric acid, nitric acid, phosphoric acid, formic acid, acetic acid or lactic acid. When anodic electrodeposition paints are intended, the resin must have a carboxyl group and the neutralizing agent is a base such as sodium hydroxide, potassium hydroxide, ammonia or an organic amine.

The amount of crosslinking agent must be sufficient to give a rigid film through a crosslinking reaction with amino, hydroxyl or carboxyl groups contained in the resin and generally ranges from 5 to 50% by weight of the modified resin on solid basis. The amount of neutralizing agent is such that at least 20%, preferably 30 to 60% neutralization of the modified resin may be achieved.

When a blocked polyisocyanate is the crosslinker, the paint formulation may contain 0.1 to 5% by weight of the blocked polyisocyanate of a catalyst such as dibutyltin dilaurate, dibutyltin oxide or other urethane-cleaving catalysts. The paint formulation may, of course, have a variety of conventional additives depending upon its particular application. Examples thereof include coloring pigments such as titanium dioxide, carbon black or ferric oxide; rustproof pigments such as basic lead silicate or aluminum phosphomolybdate; extender pigments such as kaolin, talc or clay; and other additives such as water-miscible organic solvents, surfactants, antioxidants, UV absorbers and the like. The resulting water-borne paint of the present invention may be applied on a substrate not only by the electrodeposition process but also by spraying, dipping and other conventional methods.

The following examples are intended to further illustrate the invention without limiting thereto. All parts and percents therein are by weight unless otherwise indicated. All epoxy equivalents, amine equivalents and acid equivalents of resins are on dry contents basis.

EXAMPLE 1

A reactor was charged with 752.0 parts of EPIKOTE 828 (bisphenol A epoxy resin sold by Yuka Shell Epoxy K.K., epoxy equivalent 188), 77.0 parts of methanol, 200.3 parts of methyl isobutyl ketone (MIBK), and 0.3 parts of dibutyltin dilaurate. The mixture was stirred at room temperature to make a solution. To the solution were added 174.2 parts of a 8:2 mixture of 2, 4-/2, 6-tolylenediiso-cyanate over 50 minutes. An exothermic reaction took place to raise the inner temperature to 70° C. The IR spectrometry demonstrated the absence of absorption of isocyanate group at $2280 cm^{-1}$ and the presence of absorption of urethane carbonyl group at $1730 cm^{-1}$.

After the addition of 2.7 parts of N,N-dimethylbenzyl-amine, the reaction was continued at 120° C. while removing methanol from the reaction mixture until an epoxy equivalent of 463 was reached. The IR spectrometry at this stage of reaction demonstrated the absence of absorption of urethane carbonyl group at 1730cm$^{-1}$ and the presence of oxazolidone carbonyl at 1750cm$^{-1}$.

To the reaction mixture were added 220.0 parts of p-nonylphenol and 83.3 parts of MIBK and the reaction was further continued at 125° C. until an epoxy equivalent of 1146 was reached. The mixture was allowed to cool to 110° C.. Then, 47.2 pats of aminoethylethanolamine ketimine (79% solution in MIBK), 42.0 parts of diethanolamine, 30.0 parts of N-methylethanolamine and 17.3 parts of MIBK were added. The mixture was heated to 120° C. and allowed to react for 2 hours. A modified resin having an oxazolidone resin content of 74% was obtained. The resin has a solids content of 80% and an amine equivalent of 0.96 mmol/g.

EXAMPLE 2

A reactor was charged with 730.9 parts of EPIKOTE 828, 64.3 parts of methanol, 176.0 parts of MIBK and 0.3 parts of dibutyltin dilaurate. The mixture was stirred at room temperature to make a solution. To this were added dropwise 208.8 parts of 4, 4'-diphenylmethanediisocyanate over 30 minutes. An exothermic reaction raised the inner temperature to 70° C. The IR spectrometry demonstrated the absence of isocyanate function at 2280cm$^{-1}$ and the presence of urethane carbonyl at 1730cm$^{-1}$. After the addition of 2.7 parts of N, N-dimethylbenzylamine, the mixture was heated to 130° C. and allowed to react while distilling off methanol until an epoxy equivalent of 424 was reached. The IR spectrometry at this stage demonstrated the absence of absorption of urethane carbonyl at 1730cm$^{-1}$ and the presence of absorption of oxazolidone carbonyl at 1750cm$^{-1}$. Then 62.4 parts of bisphenol A, 147.4 parts of p-nonylphenol and 108.4 parts of MIBK were added to the reaction mixture and allowed to react at 130° C. until an epoxy equivalent of 1150 was reached. After the mixture was allowed to cool to 110° C., 47.2 parts of aminoethylethanolamine ketimine (79% solution in MIBK), 42.0 parts of diethanolamine, 30.0 parts of N-methylethanolamine and 17.3 parts of MIBK were added thereto. Then the mixture was allowed to react for 2 hours at 120° C. to give a modified resin having an oxazolidone resin content of 67%, a solids content of 80.0% and an amine equivalent of 0.95 mmol/g.

EXAMPLE 3

A reactor was charged with 667.4 parts of EPIKOTE 828, 48.7 parts of methanol, 124.7 parts of MIBK and 0.2 parts of dibutyltindilaurate. The mixture was stirred at room temperature to make a solution. To this were added 110.1 parts of a 8:2 mixture of 2,4-/2,6-tolylenediisocyanate over 30 minutes. An exothermic reaction raised the inner temperature to 80° C. The IR spectrometry demonstrated the absence of absorption of free isocyanate group at 2280cm$^{-1}$ and the presence of absorption of urethane carbonyl at 1730cm$^{-1}$. After the addition of 1.7 parts of N, N-dimethylbenzylamine, the reaction was continued at 120° C. while distilling off methanol until an epoxy equivalent of 340 was reached. The IR spectrometry at this stage demonstrated the absence of absorption of urethane carbonyl at 1730cm$^{-1}$ and the presence of absorption of oxazolidone carbonyl at 1750cm$^{-1}$. Then 329.2 parts of dimer acid having an acid number 195 (VERSADYME 288 sold by Henkel Hakusui K.K.) and 43.0 parts Of 12-hydroxystearic acid were added and allowed to react at 120° C. until an epoxy equivalent of 1150 was reached. After the reaction mixture was allowed to cool to 110° C., 47.2 parts of aminoethylethanolamine ketimine (79% solution in MIBK), 42.0 parts of diethanolamine and 30.0 parts of N-methylethanolamine were added thereto. Then the mixture was allowed to react at 120° C. for 2 hours to give a modified resin having an oxazolidone resin content of 47%, a solids content of 90% and an amine equivalent of 0.75 mmol/g.

EXAMPLE 4

A reactor was charged with 649.4 parts of EPIKOTE 828, 56.0 parts of methanol, 84.0 parts of MIBK and 0.2 parts of dibutyltin dilaurate. The mixture was stirred at room temperature to make a solution. To this were added dropwise 126.6 parts of a 8:2 mixture of 2,4-/2,6-tolylenediisocyanate over 30 minutes. An exothermic reaction raised the inner temperature to 80° C. The IR spectrometry demonstrated the absence of free isocyanate group at 2280cm$^{-1}$ and the presence of urethane carbonyl at 1730cm$^{-1}$. After the addition of 2.0 parts of N,N-dimethylbenzylamine, the reaction was continued at 120° C. while distilling off methanol until an epoxy equivalent of 388 was reached. The IR spectrometry at this stage demonstrated the absence of urethane carbonyl at 1730cm$^1$ and the presence of oxazolidone carbonyl at 1750cm$^{-1}$. Then 265.0 parts of polycaprolactone polyol having a molecular weight of about 530 (PCL-205H sold by Daicel Chemical Industries, Ltd.) and 2.0 parts of N,N-dimethylbenzylamine were added and allowed to react at 120° C. until an epoxy equivalent of 1040 was reached whereupon the reaction mixture was cooled to 110° C. 47.2 parts of aminoethylethanolamine ketimine (79% solution in MIBK), 42.0 parts of diethanolamine, 30.0 parts of N-methylethanolamine and 188.4 parts of MIBK were added thereto and allowed to react at 120° C. for 2 hours. A modified resin having an oxazolidone resin content of 59%, a solids content of 80.0% and an amine equivalent of 1.04 mmol/g was obtained.

EXAMPLE 5

A reactor was charged with 711.0 parts of EPIKOTE 828, 68.6 parts of methanol, 93.6 parts of MIBK and 0.2 parts of dibutyltin dilaurate. The mixture was stirred at room temperature to make a solution. To this were added dropwise 155.2 parts of a 8:2 mixture of 2,4-/2,6-tolylenediisocyanate. An exothermal reaction raised the inner temperature to 80° C. The IR spectrometry demonstrated the absence of free isocyanate at 2280cm$^{-1}$ and the presence of urethane carbonyl at 1730cm$^{-1}$. After the addition of 2.4 parts of N,N-dimethylbenzylamine, the reaction was continued at 120° C. while distilling off methanol until an epoxy equivalent of 388 was reached. The IR spectrometry at this stage demonstrated the absence of urethane carbonyl at 1730cm$^{-1}$ and the presence of oxazolidone carbonyl at 1750 cm$^{-1}$. Then 334.0 parts of bisphenol A-ethylene oxide adduct having a hydroxyl number of 168mg KOH/g (NEUPOLE BPE-100 sold by Sanyo Chemical Industries, Ltd.), 2.4 parts of N,N-dimethylbenzylamine were added and allowed to react at 150° C. until an epoxy equivalent of 1,200 was reached whereupon the reaction mixture was cooled at 110° C. 47.2 parts of aminoethylethanolamine ketimine (79% solution in MIBK), 42.0 parts of diethanolamine, 30.0 parts of N-methylethanolamine and 87.0 parts of MIBK were added thereto and allowed to react at 120° C. for 2 hours. A modified resin having an oxazolidone resin content of 63%, a solids content of 87.0% and an amine equivalent of 0.92 mmol/g was obtained.

EXAMPLE 6

A reactor was charged with 692.3 parts of EPIKOTE 807 (bisphenol F epoxy resin sold by Yuka Shell Epoxy K.K., epoxy equivalent 170), 88.3 parts of methanol, 155.9 parts of MIBK and 0.4 parts of dibutyltin dilaurate. The mixture was stirred at room temperature to make a solution. To this were added dropwise 286.6 parts of 4, 4'-diphenylmethanediisocyanate over 30 minutes. An exothermic reaction raised the inner temperature to 90° C. The IR spectrometry demonstrated the absence of free isocyanate group at 2280cm$^{-1}$ and the presence of urethane carbonyl at 1730cm$^{-1}$. After the addition of 3.1 parts of N,N-dimethylbenzylamine, the reaction was continued at 120° C. while distilling off methanol until an epoxy equivalent of 550 was reached. The IR spectrometry at this stage demonstrated the absence of urethane carbonyl at 1730cm$^{-1}$ and the presence of oxazolidone carbonyl at 1750cm$^{-1}$. Then 171.6 parts of p-nonylphenol and 43.6 parts of MIBK were added and allowed to react at 115° C. until an epoxy equivalent of 1151 was reached whereupon the reaction mixture was cooled to 110° C. 47.2 parts of aminoethylethanol amine (79% solution in MIBK), 42.0 parts of diethanolamine, 30.0 parts of N-methylethanolamine and 101.9 parts of MIBK were added thereto and allowed to react at 120° C. for 2 hours. A modified resin having an oxazolidone resin content of 77%, a solids content of 80.0% and amine equivalent of 0.95 mmol/g was obtained.

EXAMPLE 7 (for comparison)

935.8 parts of EPIKOTE 1001 (bisphenol A epoxy resin sold by Yuka Shell Epoxy K.K., epoxy equivalent 475) were dissolved in 125.7 parts of MIBK and refluxed at 120° C. for 1 hour to remove a trace amount of water. To the solution were added 213.4 parts of p-nonylphenol and 2.7 parts of N,N-dimethylbenzylamine, and allowed to react at 120° C. until an epoxy equivalent of 1149 was reached whereupon the reaction mixture was cooled to 110° C. Then 47.2 parts of aminoethylethanolamine ketimine (79% solution in MIBK), 42.0 parts of diethanolamine, 30.0 parts of N-methylethanolamine and 2.1 parts of MIBK were added thereto, and allowed to react at 120° C. for 2 hours. An amine-modified epoxy resin having a solids content of 90.0% was obtained.

EXAMPLE 8 (for comparison)

950 parts of EPIKOTE 1001 were dissolved in 105.6 parts of MIBK and refluxed at 120° C. for 1 hour to remove a trace amount of water. To the solution were added 265.0 parts of polycaprolactone polyol having a molecular weight of about 530 (PCL-205H sold by Daicel Chemical Industries, Ltd.) and 3 .0 parts of N,N-dimethylbenzylamine, and allowed to react at 125° C. until an epoxy equivalent of 1215 was reached whereupon the reaction mixture was cooled to 110° C. Then 47.2 parts of aminoethylethanolamine ketimine (79% solution in MIBK), 42.0 parts of diethanolamine, 30 parts of N-methylethanolamine and 28.5 parts of MIBK were added and allowed to react at 120° C. for 2 hours. An amine-modified epoxy resin having a solids content of 90.0% was obtained.

EXAMPLE 9 (blocked polyisocyanate)

291 parts of a 8:2 mixture of 2,4-/2,6-tolylenediisocyanate were placed in a reactor. To this were added dropwise 218 parts of 2-ethylhexanol while maintaining the inner temperature at 40° C. and allowed to react at 40° C. for additional 30 minutes. Then the reaction mixture was heated to 60° C. whereupon 75 parts of trimethylolpropane and 0.08 parts of dibutyltin dilaurate were added thereto. The mixture was allowed to react at 120° C. for 1 hour until no absorption of isocyanate group was detected IR spectrometrically. The reaction product was diluted with 249 parts of ethylene glycol monoethyl ether.

EXAMPLE 10 (blocked polyisocyanate)

199 parts of hexamethylenediisocyanate trimer (CORONATE HX sold by Nippon Polyurethane K.K.) was diluted with 32 parts of MIBK and 0.2 parts of dibutyltin dilaurate were added thereto. To the mixture were added dropwise 87 parts of methyl ethyl ketoxime while maintaining the inner temperature at 50° C. The mixture was allowed to react at 70° C. for additional 1 hour until no absorption of isocyanate group was detected IR spectrometrically. The reaction product was diluted with 36 parts of MIBK and 4 parts of n-butanol.

EXAMPLE 11-15 AND COMPARATIVE EXAMPLES 1-2

Various electrodeposition paints were formulated using resins of Examples 1-8 and crosslinkers of Examples 9-10 as shown in Table 1 and applied electrically on a zinc phosphate-treated steel plate to a dry film thickness of 20 micron at a bath temperature of 28° C. at 50-250 volt for 3 minutes. The resulting films were baked at 170° C. for 20 minutes and tested for appearance, corrosion resistance (salt spray test) and throwing power. The results Obtained are shown in Table 2.

TABLE 1

| | Formulation (parts) | | | | | | | |
|---|---|---|---|---|---|---|---|---|
| | Example | | | | | | Comparative Example | |
| Modified resin | 11 | 12 | 13 | 14 | 15 | 16 | 1 | 2 |
| Example 1 | 283.5 | | | | | | | |
| Example 2 | | 292.5 | | | | | | |
| Example 3 | | | 240.4 | | | | | |
| Example 4 | | | | 270.0 | | | | |
| Example 5 | | | | | 270.0 | | | |
| Example 6 | | | | | | 292.5 | | |
| Example 7 | | | | | | | 252.0 | |
| Example 8 | | | | | | | | 240.0 |
| Crosslinker | | | 205.7 | | 180.0 | | | 205.7 |

TABLE 1-continued

| | Formulation (parts) | | | | | | | |
|---|---|---|---|---|---|---|---|---|
| | Example | | | | | | Comparative Example | |
| Modified resin | 11 | 12 | 13 | 14 | 15 | 16 | 1 | 2 |
| Example 9 | | | | | | | | |
| Example 10 | 190.3 | 180.0 | | 205.7 | | 180.0 | 190.3 | |
| Dibutyltin dilaurate | 5.4 | 5.4 | 5.4 | 5.4 | 5.4 | 5.4 | 5.4 | 5.4 |
| Acetic acid | 5.9 | 6.0 | 5.5 | 6.1 | 5.8 | 6.0 | 5.6 | 5.5 |
| Deionized water | 1314.9 | 1316.1 | 1343.4 | 1312.8 | 1338.7 | 1316.1 | 1346.7 | 1343.4 |

TABLE 2

| | Paint performance | | | | | | | |
|---|---|---|---|---|---|---|---|---|
| | Example | | | | | | Comparative Example | |
| Test item | 11 | 12 | 13 | 14 | 15 | 16 | 1 | 2 |
| Finish appearance | Good | Good | Good | Good | Good | Good | Good | Not good |
| Salt spray test 1000 H[1]) (mm) | 1.0–1.5 | 1.5–2.0 | 2.0–2.5 | 1.5–2.0 | 1.5–2.0 | 2.0–2.5 | 5.5–6.0 | 3.5–4.0 |
| Throwing power[2]) (cm) | 24 | 23 | 23 | 25 | 24 | 24 | 16 | 20 |

Foot note of Table 2:
[1])According to JIS K5400. The values indicate the width of rust developed on the test plate measured from a cross cut.
[2])The test composition is placed in a cylindrical stainless steel cell of 140 mm inner diameter and 350 mm depth, and maintained at a temperature of 28° C.

A zinc phosphate-treated steel strip of 400 mm length × 16 mm width × 0.8 mm thickness is inserted within the bore of a stainless steel pipe of 17.5 mm inner diameter × 400 mm length. This assemblage is immersed vertically into the liquid with the lower edges of the pipe and strip being flush and spaced 20 mm apart from the cell wall. The assemblage is connected to a DC current source as one electrode. The stainless steel cell is used as a counter electrode.

Then electric current is applied across both electrodes for 3 minutes at a predetermined voltage required for forming 20 micron film thickness. The coating bath is stirred into vortex during the electrodeposition process.

thereafter, the steel strip substrate is removed from the coating bath and rinsed with water. The length of deposited film was noted. The throwing power is represented as the mean length of the deposited film.

EXAMPLE 17

A reactor was charged with 752.0 parts Of EPIKOTE 828, 77.0 parts of methanol, 200.3 parts of MIBK and 0.3 parts of N,N-dimethylbenzylamine. The mixture was stirred at room temperature to make a solution. To this were added dropwise 174.2 parts of a 8:2 mixture of 2,4-/2,6-tolylenediisocyanate over 50 minutes. An exothermic reaction raised the inner temperature to 70° C. The IR spectrometry demonstrated the absence of isocyanate group at 2280cm$^{-1}$ and the presence of urethane carbonyl at 1730cm$^{-1}$. After the addition of 2.7 parts of N,N-dimethylbenzylamine, the reaction was continued at 120° C. while distilling off methanol until an epoxy equivalent of 463 was reached. The IR spectrometry at this stage demonstrated the absence of urethane carbonyl at 1730cm$^{-1}$ and the presence of oxazolidone carbonyl at 1750cm$^{-1}$. Then 220.0 parts of p-nonylphenol and 83.3 parts of MIBK were added and allowed to react at 125° C. until an epoxy equivalent of 1146 was reached. The reaction mixture was further reacted with 188.2 parts of azelaic acid in 47.0 parts of MIBK at 115° C. until an acid equivalent of 0.75 mmol/g was reached. A modified resin having a solids content of 80% was obtained.

This resin was cooled to 70° C. and mixed thoroughly with 1270.9 parts of the crosslinker of Example 10, 33.4 parts of dibutyltin dilaurate and 40.4 parts of triethylamine. The mixture was diluted with 7633 parts of deionized water to make an emulsion having a solids content of 20%.

This emulsion was applied electrically on a zinc phosphate-treated steel plate at 160 volt for 3 minutes and baked at 170° C. for 20 minutes. A cured film having good appearance and a film thickness of 20 micron was obtained.

EXAMPLE 18

A reactor was charged with 649.4 parts of EPIKOTE 828, 56.0 parts of methanol, 84.0 parts of MIBK and 0.2 parts of dibutyltin dilaurate. The mixture was stirred at room temperature to make a solution. To this were added dropwise a 8:2 mixture of 2,4-/2,6-tolylenediisocyanate. An exothermic reaction raised the inner temperature to 80° C. The IR spectrometry demonstrated the absence of isocyanate group at 2280cm$^{-1}$ and the presence of urethane carbonyl at 1730cm$^{-1}$. After the addition of 2.0 parts of N,N-dimethylbenzylamine, the reaction was continued at 120° c. while distilling off methanol until an epoxy equivalent of 388 was reached. The IR spectrometry at this stage demonstrated the absence of urethane carbonyl at 1730cm$^{-1}$ and the presence of oxazolidone carbonyl at 1750cm$^{-1}$. Then 265.0 parts of PCL-205H and 2.0 parts of N,N-dimethylbenzylamine were added and allowed to react at 125° C. until an epoxy equivalent of 1040 was reached. The reaction product was further reacted with 188.2 parts of azelaic acid in 47.2 parts of MIBK at 115° C. to give a modified resin having a solids content of 90% and an acid equivalent of 0.81 mmol/g.

After cooling to 70° C., the resin was thoroughly mixed with 1170.7 parts of the crosslinker of Example 9, 30.7 parts of dibutyltin dilaurate and 40.4 parts of triethylamine. The mixture was diluted in 8110 parts of deionized water to make an emulsion having a solids content of 20%.

This emulsion was applied electrically on a zinc phosphate-treated steel plate at 160 volt for 3 minutes and baked at 170° C. for 20 minutes. A cured film having good appearance and film thickness of 20 micron was obtained.

We claim:

1. A method for producing a hydrophilic modified resin comprising:

reacting (a) an oxazolidone ring-containing epoxy resin of the formula:

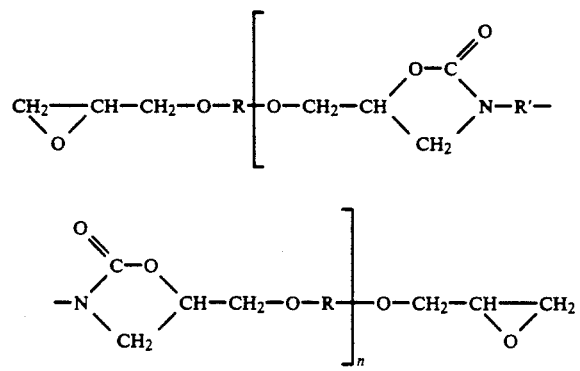

wherein R is the residue of a diglycidyl ether or rester compound with removal of the glycidyloxy group, R' is the residue of an organic diisocyanate with removal of the isocyanate group, and n is an integer selected such that the number average molecular weight of the hydrophilic modified resin is from 600 to 4,000, with (b) a first active hydrogen compound selected from the group consisting of a monoalcohol, a diol, a mixture of said monoalcohol and diol, a monocarboxylic acid, a dicarboxylic acid and a mixture of said mono- and dicarboxylic acid in less than stoichiometric amount based on the active hydrogen atom/epoxy group ratio; and reaction the resulting product with (c) a second active hydrogen compound capable of introducing an ionizable group to said hydrophilic modified resin in at least a stoichiometric amount relative to the remaining epoxy groups.

2. The method according to claim 1, wherein said oxazolidone ring-containing epoxy resin is a reaction product of said diglycidyl ether or ester with said diisocyanate or its blocked product.

3. The method according to claim 1, wherein said first active hydrogen compound (b) is an aliphatic diol, an alicyclic diol, an aromatic dihydroxyl compound, a bifunctional polyester polyol or a bifunctional polyether polyol.

4. The method according to claim 1, wherein said first active hydrogen, compound (b) is an aliphatic dicarboxylic acid, an aromatic dicarboxylic acid or a carboxyl terminated butadiene-acrylonitrile copolymer.

5. The method according to claim 1, wherein said first active hydrogen compound (b) is an aliphatic primary alcohol or a monophenol.

6. The method according to claim 1, wherein said first active hydrogen compound (b) is an aliphatic monocarboxylic acid or an aromatic monocarboxylic acid.

7. The method according to claim 1, wherein said second active hydrogen compound (c) is a primary amine, a secondary amine, an acid addition salt of tertiary amine or a sulfide-acid mixture.

8. The method according to claim 1, wherein said second active hydrogen compound is a polycarboxylic acid.

9. A hydrophilic modified resin produced by the method of claim 1.

10. The hydrophilic modified resin as claimed in claim 9 containing from 35 to 95% by weight of said component (a) on solid basis.

11. The hydrophilic modified resin as claimed in claim 9 containing from 45 to 85% by weight of said component (a) on solid basis.

12. A water-borne paint comprising the hydrophilic modified resin of claim 9 dispersed in an aqueous medium containing a crosslinker and a neutralizing agent.

13. The water-borne paint as claimed in claim 12, wherein said crosslinker is a blocked polyisocyanate.

14. The water-borne paint as claimed in claim 12, wherein said crosslinker is a melamine resin.

* * * * *